United States Patent
Novak et al.

(10) Patent No.: US 7,118,069 B2
(45) Date of Patent: Oct. 10, 2006

(54) INTEGRATED WINDOW BELT SYSTEM FOR AIRCRAFT CABINS

(75) Inventors: Keith H. Novak, Shoreline, WA (US); Robert W. Mumm, Everett, WA (US); Karen L. Hills, Everett, WA (US); Joe S. Wong, Bellevue, WA (US); Shawn M. Pare, Woodinville, WA (US); Julia W. Miller, Lake Stevens, WA (US); Art Waidner, Everett, WA (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 11/002,605

(22) Filed: Dec. 2, 2004

(65) Prior Publication Data

US 2006/0118676 A1 Jun. 8, 2006

(51) Int. Cl.
*B64C 1/14* (2006.01)

(52) U.S. Cl. .................... 244/119; 244/129.3

(58) Field of Classification Search ........... 244/117 R, 244/118.5, 119, 133, 129–3; 52/460, 204.1, 52/213, 302.3, 347
See application file for complete search history.

(56) References Cited

U.S. PATENT DOCUMENTS

| | | | |
|---|---|---|---|
| 2,912,724 A * | 11/1959 | Wilkes ................... 52/302.3 |
| 4,050,208 A | 9/1977 | Pompei et al. |
| 4,319,528 A * | 3/1982 | Gutridge et al. ........... 105/397 |
| 4,364,533 A | 12/1982 | Pompei et al. |
| 4,385,131 A * | 5/1983 | Fracalossi et al. ........... 521/55 |
| 4,541,595 A | 9/1985 | Fiala et al. |
| 4,739,955 A | 4/1988 | Aquino et al. |
| 4,799,631 A * | 1/1989 | Humphries et al. ...... 244/118.5 |
| 4,832,463 A * | 5/1989 | Goldner et al. ............. 359/275 |
| 5,044,578 A | 9/1991 | White et al. |
| 5,201,831 A * | 4/1993 | Higgins et al. ............. 244/119 |
| 5,333,416 A | 8/1994 | Harris et al. |
| 5,462,243 A | 10/1995 | Hart et al. |
| 5,472,760 A * | 12/1995 | Norvell ..................... 428/71 |
| 5,788,184 A | 8/1998 | Eddy |
| 6,227,491 B1 | 5/2001 | Stephan et al. |
| 6,547,184 B1 | 4/2003 | Nieberle |
| 6,601,799 B1 | 8/2003 | Lau et al. |
| 6,736,352 B1 | 5/2004 | Bladt et al. |
| 6,786,453 B1 * | 9/2004 | Jones ..................... 244/129.3 |
| 2003/0234322 A1 * | 12/2003 | Bladt et al. ............. 244/129.3 |
| 2004/0065777 A1 | 4/2004 | Hopkins et al. |
| 2005/0044712 A1 * | 3/2005 | Gideon et al. ........... 29/897.32 |
| 2005/0082431 A1 * | 4/2005 | Scown et al. ............... 244/119 |

* cited by examiner

*Primary Examiner*—Galen Barefoot
(74) *Attorney, Agent, or Firm*—Ingrassia Fisher & Lorenz, P.C.

(57) ABSTRACT

A system and a method is provided for fitting an aircraft cabin with modular sidewall panels, window reveals, and foam insulation blocks in an integrated manner. The system comprises a sidewall panel which may have one or more openings therethrough to receive a window reveal held by snap-fit fastenings. The bezel of the window reveal may be held by snap-fit fasteners for easy removal to allow removal and cleaning of the inner dust cover disassembly of the sidewall panel. Foam insulation blocks may be molded to fit in the cavity between the outer wall of the aircraft and the sidewall panels, held in place by compressive pressure between the frames of the airframe. The outer extent of the window reveal is tapered inwardly to guide the window reveal to mating contact with an outer window assembly in the aircraft fuselage without further adjustment of the sidewall panel.

34 Claims, 6 Drawing Sheets

INTEGRATED WINDOW BELT SYSTEM FOR AIRCRAFT CABINS

BACKGROUND OF THE INVENTION

The present invention generally relates to interior assemblies for aircraft, and more particularly to a system of sidewall panels, window assemblies, and insulation structures for installation upon a cabin wall within the interior of an aircraft.

Fabrication of a commercial aircraft typically consists of building an airframe (sometimes referred to as a primary structure or fuselage) consisting of a series of vertically oriented frames, or ribs, that encircle a cabin area for transporting personnel and cargo. The outboard side of the frames is covered with an outboard wall or skin and the inboard side of the frames in the cabin area may similarly be covered with sidewall trim panels. Along the outboard wall and between the frames, other aircraft components such as insulation, electrical conduits, ventilation ducting, control mechanisms, and the like may be installed, so that they may be enclosed between the outboard wall and the sidewall trim panels. Provisions must also be made for windows that must extend through the space between the inner and outboard walls.

The outboard wall is fixedly attached to each frame by standard means well known to the industry, such as by rivets, so that structure and rigidity is provided for the airframe, but the sidewall trim panels must be removable to allow access to these other aircraft components in the space between the sidewall and outboard wall. To facilitate removal and installation of the sidewall trim panels, elaborate systems of special fasteners, insulation supporting mechanisms, window reveals, and outer window assemblies have been devised to allow access to the aircraft components within the space. Therefore, current inner sidewall systems have been constructed piecemeal of many numerous components, and this has made installation and removal expensive in terms of number of sidewall parts and time required to remove and replace them.

In general, the inner sidewall system may include four basic components, namely, sidewall panels, window reveals, insulation between the inner sidewall and the outboard wall, and a fastening arrangement to allow each component to be installed, removed, and replaced while minimally affecting the other components. However, each component of an inner sidewall system has its own set of design issues.

The sidewall trim panels of commercial passenger aircraft are typically configured as a number of generally curved vertical panels that extend between the floor and storage bin of the aircraft in a side-to-side manner along either interior wall of the aircraft. Insulation is located behind the sidewall trim panels to reduce the amount of noise and vibration resulting from such external sources as the aircraft engines or turbulent air flow to the cabin. This noise and vibration is further reduced by mounting the sidewall trim panels against rubber shock absorbers which are also known as "shock mounts", and which are affixed to the frames of the aircraft. However, the sidewall trim panels must be held securely against the shock mounts so that any vibration of the airframe does not cause these panels to vibrate against the frame, shock mounts, and other interior components.

In addition to these habitability factors of reduced noise and vibration, it is desirable that the panels and insulation be installed and removed easily and rapidly. This is true not only during the initial construction of the aircraft, but also later on when maintenance is being performed. A number of air conditioning ducts and electrical wiring harnesses are typically routed behind the panels, and these ducts and wiring must be accessible by removing the sidewall trim panels.

In many conventional passenger aircraft, the sidewall trim panels have tabs that extend outwardly from the vertical edges of the panels. The panels are secured by horizontal bridge fasteners which are inserted over the tabs of adjacent sidewall trim panels and which are connected to the frames via the shock mounts by screw fasteners. A decorative vertical trim strip may be inserted between the edges of the adjacent panels and over the tabs to provide a pleasing appearance to the cabin. Behind the panels are located the shock mounts that are riveted to the frame. The shock mounts include threaded receptacles for securing the bridge fasteners to the aircraft. Insulation is installed behind the sidewall panels and secured to the vertical frames of the airframe.

Since the shock mounts are conventionally prelocated by being riveted to the aircraft frames prior to attaching the panels or insulation, it is sometimes difficult to properly secure the panels to the aircraft. This is because either the tabs of the adjacent panels do not properly align with each other to permit simultaneous engagement by the bridge fasteners, or because the tabs do not align with the position of the bridge fastener; the position of the bridge fastener being fixed by the location of the mounting holes in the prelocated shock mount. Furthermore, the lengthwise gap between the edges of the adjacent panels may be too small to accommodate a vertical trim strip, or the projecting screw fasteners may prevent the trim strip from being easily inserted in the gap.

Windows are generally constructed with an outer window assembly that becomes a part of the airframe and a window reveal that is attached through a hole in a sidewall trim panel and mated to the outer window assembly. This mating of the window reveal with the outer window assembly allows the window reveal to be removed without requiring removal of the outer window assembly. Current aircraft designs include the use of different hardware fastener mechanisms for attaching a window reveal to an aircraft sidewall panel. A typical window reveal may include a dust cover and other ancillary items such as shades. The most common of these assemblies require the combination of hardware fastener mechanisms, typically brackets, gaskets, and adhesives to affix the reveal to an aircraft's fixed outboard wall or skin. The brackets are affixed, via the adhesive, to the sidewall trim panel. The window reveal is then affixed to the brackets. In other installations, the window reveal is affixed to the sidewall trim panel using both mechanical affixing and adhesive affixing. The placement of both the fasteners and the window reveal must be precise within the sidewall trim panel so that the window reveal can be easily mated up to the opposing outer window assembly when the panel and window reveal are installed. This installation of the numerous brackets can be very labor intensive and time consuming; the sidewall must first be sanded and the adhesive must then be applied and allowed to cure for an extended period, before the window reveal can be affixed to the brackets. Further installation often requires specially designed tools or locating jigs. In addition, fuel economy can be negatively affected as the brackets and adhesives add weight to the aircraft, which in turn adds to the operating cost of the aircraft. In addition, the brackets can be very pliable and weak or brittle. They may therefore be subject to increased maintenance and replacement costs.

Additionally, because there is quite a variation in affixing mechanisms between various airplane models, standardization of the window assemblies across airplane models is difficult. Difficult access to whole or part of the window assembly makes standard window maintenance, like cleaning, expensive and time consuming. This is because maintenance must be done by removing the whole window assembly or accessing the whole sidewall.

The system of fasteners and brackets must be consistently and uniformly attached to the frames and the sidewall trim panels so that they correctly align. The brackets must be precisely placed within close tolerances on the frames and outboard surface of the sidewall trim panel in a very exacting manner, so that the sidewall trim panel may be accurately aligned. To achieve these close tolerances, one of two methods is generally used; either special locating jigs must be utilized or else slots must be incorporated into the sidewall trim panel so that it can be adjusted both up/down and fore/aft for precise fit. Such methods must be used since the brackets cannot be precisely placed when they are affixed by adhesives. This alignment operation is very tedious and exacting, and it leads to significant assembly costs because installers must take substantial time and care to precisely affix and adjust the brackets.

The installation and placement of insulation within the inter-sidewall space can also be difficult and time-consuming. It is well known in the art that an insulation layer is required between the sidewall panels and the outboard wall for purposes of retaining heat within the aircraft cabin, reducing vibration, and reducing external noise. Heretofore, bats of woven insulation or bags of limp fiberglass have been affixed to the exterior wall and fuselage of the aircraft cabin and held in place with brackets and clips inserted through the insulation material, so that they may be held in place until the sidewall trim panels can be installed over the insulation materials. However, one disadvantage of this process is that the initial installation of such insulation involves extensive technician time in order to create and seal numerous penetrations in the insulation, to place the numerous brackets required for holding the insulation, and to attach the insulation to the brackets. Furthermore, the entire length of the cabin must be fitted with the insulation layer before any of the sidewall trim panels are installed. Another disadvantage is that, because of the limp nature of traditional insulation, many penetrations must be made for supporting brackets, which in turn can cause numerous gaps in the insulation. These gaps greatly diminish the ability of such insulation to reduce noise since they create flanking paths though which noise may efficiently transmitted. Still another disadvantage is that the numerous brackets increase the weight of the aircraft and must themselves be affixed to the frames and exterior wall of the fuselage, which further increases technician time. When the insulation layer must be removed for maintenance at some point along the cabin wall, the technician must again spend a significant amount of time removing and reinstalling the insulation layer.

The prior art addresses numerous aspects of the different sidewall components in isolation. For example, U.S. Pat. No. 6,227,491 discloses a modular window unit that may be affixed to an interior sidewall trim panel of an aircraft. The window unit is centered in an opening of the sidewall trim panel by means of a centering lug located at the bottom center portion of the window unit and is assisted by tabs located on each bottom corner of the window unit. The tabs serve as an axis for holding the window unit to the bottom portion of the opening in the panel and rotating the top portion into the opening, to be detachably connected there by opposing snap fastenings on either side of the upper opening. The disclosure does not discuss how the sidewall trim panels are attached to the outer wall of the aircraft, nor does it describe the details of wiring and insulation that must be operationally inserted between the outer wall and inner sidewall trim panel.

U.S. Pat. No. 4,739,955 discloses an aircraft sidewall trim panel and insulation retainer for affixing the panel to the inboard frame of an aircraft. An aircraft panel is described that is secured at its lower side to a longitudinal dado panel running the length of the cabin and at its upper edge to an upper fixed portion of the cabin structure, such as a longitudinally extending row of storage bins. The panel is made of a resilient bendable material that is flexed against special shock absorbing retainers by the upper and lower edges of the panels. The retainers maintain the panel at a spaced distance from the aircraft frame members by use of an elastometric plug held by the retainer against the outer panel surface, in order to prevent vibration of the sidewall panel. The retainer also holds bats of insulation in place between the panel and the outer wall of the aircraft.

Thus, there exists a need to provide a system and method of configuring an aircraft interior sidewall that may be easily installed and removed for maintenance without requiring excessive time or equipment. There is also a need for a sidewall that allows aircraft components between the interior sidewall and the exterior sidewall to be accessed without having to remove an excessive number of adjacent aircraft components from their installed position. Finally there is a need for a system of sidewall panels, insulation, window assemblies and supporting brackets that minimizes gaps and effectively controls noise transmission.

SUMMARY OF THE INVENTION

An embodiment of the present invention provides an integrated window belt system that may easily be installed on the inboard side of an aircraft frame within the cabin along the structural windows in the outboard wall of the aircraft. The system provides an integrated set of components comprising a snap-in sidewall panel subsystem, a snap-fit window reveal subsystem, a thermo-acoustic insulation subsystem, enabling architecture system support bracketing subsystem, which may collectively eliminate multiple parts and fasteners, as well as the tedious efforts required to install them, by the use of snap-fit features. The thermo-acoustic insulation subsystem may be slightly compressed by the panels to provide vibration damping qualities as it interacts with the outer panel surface. The sidewall panel subsystem may be rapidly assembled and installed against the interior aircraft frame between a lower dado panel and an upper storage bins system, each of which extend longitudinally down the cabin. Each panel may be rapidly installed, removed for maintenance, and reconfigured without special tools. All components may be designed to interconnect by use of snap-fit attachments, as will be presently seen.

In one aspect of the present invention, a sidewall panel is provided for use within a cabin of an airframe formed by frames and an outboard wall, the cabin having dado panel along a floor of the cabin and longitudinally extending the length of the cabin, the cabin further having an upper structure longitudinally extending along the upper portion of the cabin. The sidewall panel may comprise a curved structure conforming in an operationally installed position to an inboard side of the frames, the curved structure having a panel opening, an inboard surface, an outboard surface, a lower edge, and a top edge; a first snap-fit fastener aligned along the lower edge for removable attachment of the lower edge of the curved surface to the dado panel; and an attachment apparatus along the top edge for pivotal attachment with the upper structure, so that the attachment apparatus supports the curved surface for swinging inboard and outboard movement about an longitudinally oriented axis formed by the attachment apparatus.

In another aspect of the present invention, a sidewall panel assembly is provided, where the assembly comprises a sidewall panel and a window reveal. The sidewall panel may have a panel opening, an inboard surface, an outboard surface, and a first fastener, where the first fastener may be integral with the sidewall panel and disposed to allow removable attachment of the sidewall panel to an aircraft frame. The window reveal may have a rim and an inwardly tapering perimeter, so that the window reveal may be sized for snug insertion through the panel opening, and the window reveal may be removably attached within the panel opening and against the inboard surface by a second fastener that is integral to the window reveal. When the sidewall panel is positioned for operational attachment on an interior of an aircraft frame with the panel opening generally opposing an outer window assembly in an outboard wall, the outboard edge of the window reveal may position both it and the sidewall panel into their operationally installed positions as the inward taper guides the outboard edge into a mating relationship with the outer window assembly.

In another aspect of the present invention, a sidewall panel assembly is provided for an airframe covered by an outboard wall with structural openings therethrough. The sidewall panel assembly comprises an outer window assembly held within the structural opening by a window forging and a composite ring, the outer window assembly with an inner and outer pane supported by an outer window gasket within the window forging, the composite ring with a gasket having an annular groove; a sidewall panel having a panel opening, an inboard surface, and an outboard surface, where the sidewall panel is operationally positioned with the outboard surface aligned with an inboard side of the frame; an window reveal with a rim and an inwardly tapering perimeter, the window reveal sized for snug insertion through the panel opening with the inwardly tapering perimeter received by the annular groove; and a plurality of foam insulation blocks captured between the sidewall panel and the outboard wall.

In another aspect of the present invention, a modular sidewall panel system is provided for an aircraft having a cabin inboard of an airframe, such that the airframe is comprised of vertically oriented frames, each of which having an inboard side and an outboard side, and an outboard wall permanently attached to an outboard side of the frames, the outboard wall having a plurality of regularly spaced structural openings extending longitudinally along and through the outboard wall and between the frames, the cabin having a floor, a dado panel extending longitudinally the length of the cabin adjacent to the floor and below the structural openings, and an upper structure extending longitudinally the length of the cabin over the structural openings, each aperture with an outer window assembly. The system may comprise a sidewall panel with an upper edge and a lower edge, the sidewall panel being supported along its lower edge by the dado panel and attached along its upper edge to the upper structure, the sidewall panel further conforming to the inboard side of the frames and having a panel opening generally opposing one of the structural openings when the sidewall panel is supported and attached; a window reveal with a rim and a inwardly tapering perimeter, the window reveal being adapted for insertion through the panel opening from the inboard side of the sidewall panel, the rim resting on the inboard side of the sidewall panel to constrain further insertion therethrough, the inwardly tapering perimeter aligning with and opposing the outer window assembly; and one or more foam insulation blocks formed and adapted for capture between the sidewall panel and the outboard wall.

In a further aspect of the present invention, a method of assembling a maintainable modular sidewall panel system within an aircraft cabin is provided, where the cabin has a floor and a plurality of frames extending upwardly from the floor, each frame having an inboard side and an outboard side, an outboard wall attached to an outboard side of the plurality of frames, the outboard wall with a plurality of structural openings extending longitudinally along and through the outboard wall and between the plurality of frames, the cabin having a dado panel extending longitudinally the length of the cabin adjacent to the floor and below the plurality of structural openings, the cabin further having an upper structure extending longitudinally the length of the cabin above the plurality of structural openings, each structural opening with an outer window assembly. The method comprises the following steps: installing brackets along the plurality of frames; inserting an outer window assembly within each structural opening, each outer window assembly having a inwardly protruding window forging; attaching a plurality of insulation foam blocks along the outboard wall; suspending the plurality of sidewall panels from the upper structure so that each sidewall panel conforms to the inboard side of the plurality of frames each sidewall panel having an upper edge and lower edge, each sidewall panel suspended along its upper edge for pivotal motion inwardly and outwardly about a horizontal axis along its upper edge, a selected number of the plurality of sidewall panels having at least one panel opening, each of the selected number longitudinally positioned so that each panel opening generally opposes one of the structural openings when the sidewall panel is aligned with the inboard side of the plurality of frames; inserting through each panel opening from the inboard side of the sidewall panel a window reveal with a rim and a inwardly tapering perimeter, the rim held against the inboard side of the sidewall panel by snap-fit fasteners and constrained from further insertion by the rim; and bringing the lower edge of the sidewall panel into attachment with the dado panel, thereby capturing the foam insulation blocks between the sidewall panel and the outboard wall and allowing the inwardly tapering perimeter of the window reveal to be guided into the window forging, wherein a tapering fit between the window forging and the inwardly tapering perimeter aligns the sidewall panel with the plurality of frames.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

For ease of understanding the orientation in the drawings, the terms "inside", "inboard", and "interior" shall refer a direction oriented from the viewpoint of a person standing within the cabin of the aircraft, and the terms "outside", "outboard", and "exterior" shall refer to a direction oriented from the viewpoint of a person outside of the cabin observing the aircraft. Thus, a sidewall trim panel will have an interior side and an exterior side, where the interior side is that surface of the installed panel as seen by a person within the cabin of the aircraft and the exterior side is that surface of the installed panel that is seen by a person outside of the cabin of the aircraft. Other such descriptions will be obvious from the context.

Broadly, the current invention provides a highly integrated window belt system for aircraft having an airframe comprising a series of vertically oriented frames, an outboard wall configured along the outboard side of the frames, and structural window openings in the outboard wall. Prior art systems similar to the system disclosed herein require numerous fasteners and brackets to permit the system to be installed. Furthermore, the insulation arrangement consists generally of numerous sacks of insulation material that are suspended against the outboard wall by complicated bracketing arrangements. The inventive system presented herein employs the use of snap-fit fasteners for all interior, non-structural components so that sidewall panels and window reveals can be easily assembled, installed, and removed with minimal alignment and bracketing arrangements. Insulation between the sidewall panels and the outboard walls may be in the form of self-supporting foam blocks that require few, if any, brackets and may be held in place by compressive force between the frames. The integrated window belt system can be easily assembled and installed along the interior walls of an aircraft cabin between the lower dado panel and the upper storage bins without excessive parts and tools. The sidewall system can also be rapidly disassembled for maintenance and reconfiguration without special tools. The integrated window belt system may include a cooperative set of subsystems that enhance maintainability. These subsystems may include a snap-in sidewall panel subsystem, a snap-fit window assembly subsystem, a thermo-acoustic insulation subsystem, enabling architecture system support bracketing subsystem. All subsystems are designed to interconnect by use of snap-fit attachments, as will be presently seen.

For purposes of this disclosure, a snap-fit fastener may be considered to be a mechanical joint system where the part-to-part attachment is accomplished with locating and locking features (i.e. constraint features) that are homogeneous with or integral to one or the other of the components being joined. Such joining may require the (flexible) locking features to move aside for engagement with the mating part, followed by a return of the locking feature toward its original position to accomplish the interference required to fasten the components together. Locator features, the second type of constraint feature, are inflexible, providing strength and stability to the attachment. Although any of the three types of snap-fit fastenings, i.e. annular, cantilever, and torsional, may be used with the components described herein, the cantilever type may be used and described in the embodiments described herein without limiting the scope of the disclosure.

Figure 1:
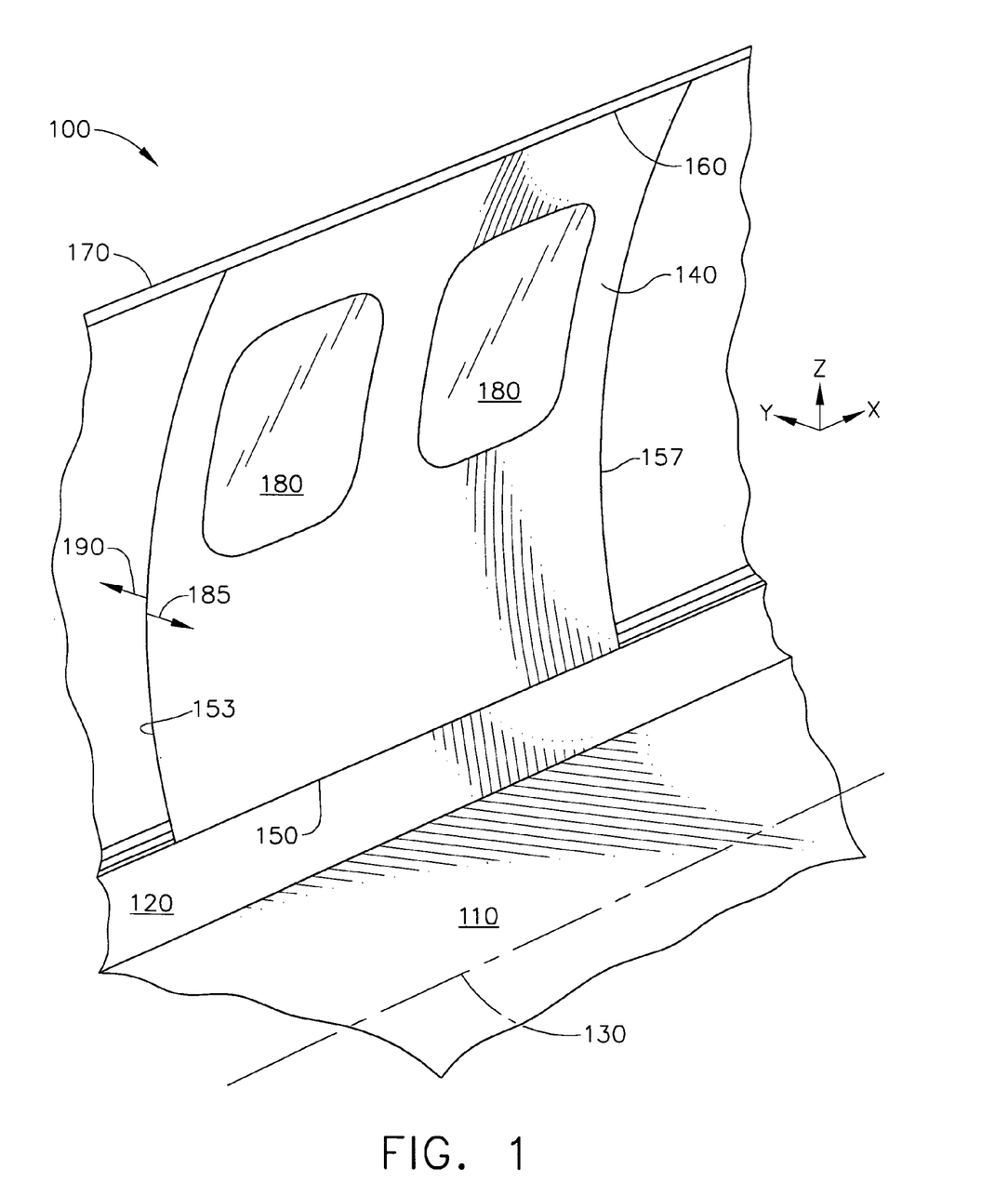
FIG. 1 is a perspective view of a typical sidewall panel and its orientation to the interior of an aircraft, according to an embodiment of the present invention.

Referring now to FIG. 1, a portion of an interior of a conventional aircraft cabin is generally indicated at 100. The aircraft cabin 100 may have a floor 110, from which upwardly extends a dado panel 120. A longitudinal axis of the aircraft cabin 100 is indicated by line 130. The dado panel 120 longitudinally extends along the walls of the aircraft cabin 100 in an orientation parallel with line 130, and in general it provides a means for equalizing pressure within the cabin and for providing interior air to the cargo compartments below (not shown.) One or more sidewall panels 140 may extend upwardly from the dado panel 120, only one of which is shown for ease of illustration. The sidewall panel 140 may be curved structure that is pre-shaped to conform to the curve of the aircraft frame, so that its inboard surface 185 may have a generally concave aspect and its outboard surface 190 may have a generally convex aspect. The sidewall panel 140 may be mounted on and supported by the dado panel 120 along a lower edge 150 of the sidewall panel 140 and connected along an upper edge 160 of the sidewall panel 140 to an upper structure 170 of the cabin structure which also extends longitudinally the length of the cabin along line 130. The sidewall panel 140 may be affixed to the dado panel 120 and the upper structure 170 by an attachment mechanism that will be described presently.

For installation, the sidewall panel 140 may be suspended from its upper edge 160 so as to create a horizontal axis about which the sidewall panel 140 may pivot. The attachment mechanism by which the upper edge 160 is suspended from the upper structure 170 may be accomplished by any number of means without departing from the scope of the invention. For example, hooks may be provided along the upper edge 160 to engage brackets attached to each of the frames covered by the sidewall panel. In another example, the brackets may have upwardly protruding tabs that engage holes or slots in the outboard surface 190 of the sidewall panel 140. By such a mechanism, the lower edge 150 may be moved outboard to bring the sidewall panel 140 into position against the frame, or the lower edge 150 may be moved inboard to bring the sidewall panel 140 away from the frame so that the sidewall panel 140 may be removed. The lower edge 150 may be removably attached to the dado panel 120 by a snap-fit fastening. Alternatively, the lower edge 150 may be removably attached to a bracket 510 that is part of the enabling architecture (to be described presently), with the dado panel 120 also being attached thereto. The dado panel 120 may also provide for a small degree of fore/aft translation along the horizontal axis to allow for alignment. The dado panel 120 may support the sidewall panel 140 in the vertical and inboard/outboard directions. Suspending the sidewall panel 140 from its upper edge 160 may allow a mechanic or technician to attach the lower edge to the dado panel without having to hold the panel in place off of the cabin floor. It also allows the sidewall panel 140 to avoid contact with any downwardly extending protrusions from the upper structure 170 of the cabin structure when the sidewall panel 140 rotated inwardly away from the frame.

Figure 2:
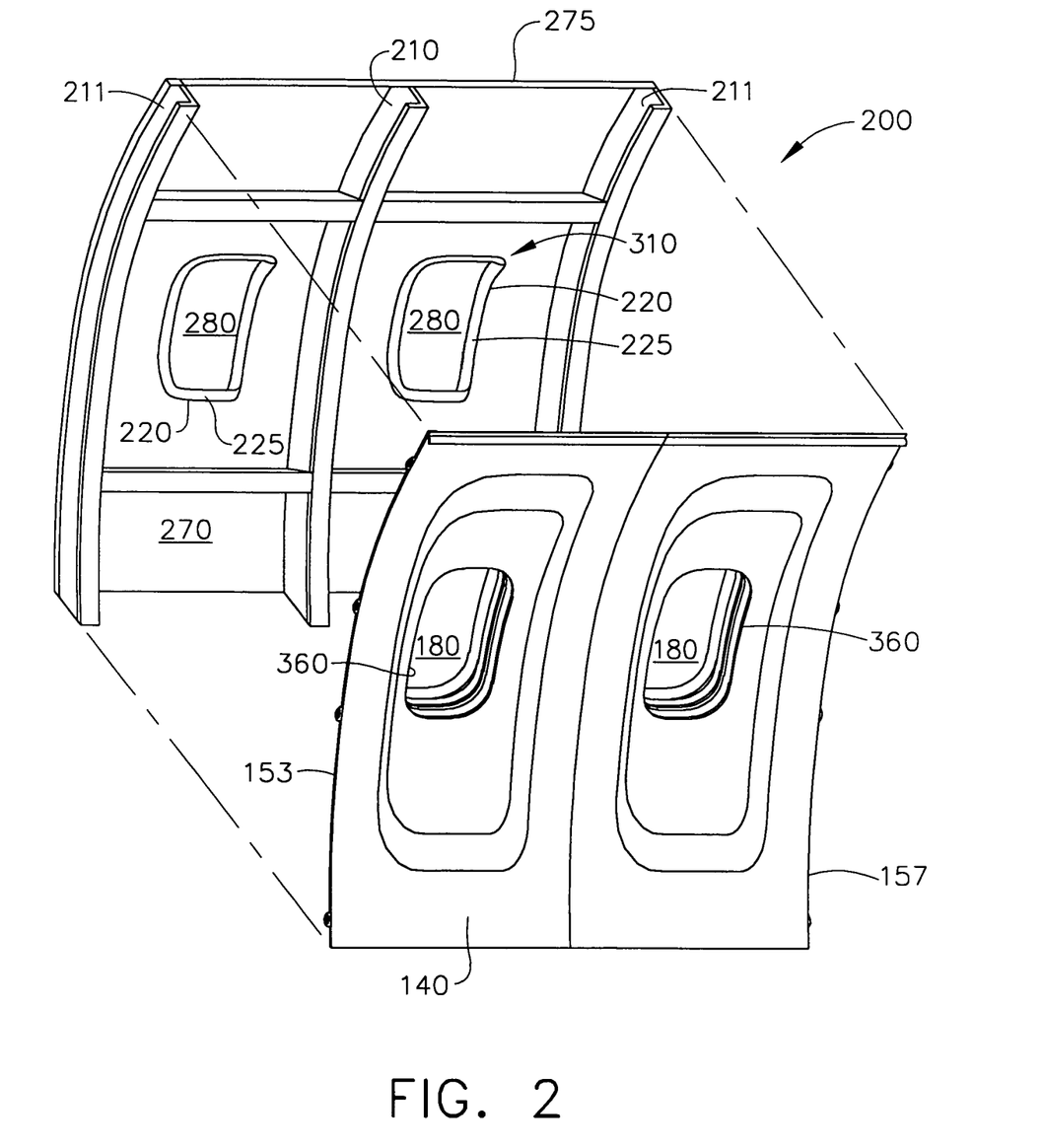
FIG. 2 is a perspective view of a typical sidewall panel and its relationship to the frames comprising the airframe, according to an embodiment of the present invention.

Referring now to FIG. 2, a typical sidewall panel assembly 200 may include a sidewall panel 140 with a panel opening 180 therein to accommodate a window reveal 360. It has been found that a sidewall panel 140 having two such panel openings 180 may provide a convenient size for a panel assembly 200 that may be installed without undue hardship on the technician, but the scope of the invention should not be considered as being limited to a two-opening structure. Two panel openings 180 will be shown for illustrative purposes. The sidewall panel 140 may span vertical frames 210, 211 comprising the aircraft frame, where the number of vertical frames 210, 211 is one more than the number of panel openings 180. The outermost vertical frames 211 may be positioned outboard of the left edge 153 and the right edge 157 of the sidewall panel 140, respectively, with the vertical frames 210 between the outermost frames 211 being positioned between two adjacent panel openings 180. Each frame 210, 211 may typically have a cross sectional aspect resembling an "L", an "I", or a "J".

The panel openings 180 in sidewall panel 140 may be configured to oppose similar structural openings 280 in the inboard surface 270 of an outboard wall 275 covering the aircraft frame. Within each structural opening 280 may be inserted an outer window assembly 310 and held in place to the outboard wall by a window forging 220 with a flange 225 around its circumference extending in an inboard direction perpendicular to the outboard wall 275 and a flange 221 around its outboard extent that extends inwardly into the opening. As will be presently described, the window reveal 360 may be tapered in an outboard direction so that, as it is inserted into a composite ring 370 that is affixed to flange 225 of forging 220, it will align the sidewall panel 140 with relationship to the frames 210, 211.

The composite ring 370 may be used in an embodiment of the invention to fixedly hold the outer window assembly 310 in the window forging 220. Prior art structures have used discrete brackets for accomplishing this same function. Because the composite ring 370 is continuous rather than discrete, it may form an annular ring for receiving, aligning, and sealing the window reveal 360. This may be significant for three reasons. First, the use of a single continuous ring may provide a much simpler mounting structure than the use of a discrete number of brackets or clips, which have been extensively optimized to provide structure to secure the window without uneven stress or damage. Second, a single part, i.e. the composite ring, may replace numerous brackets, which reduces the parts count and allows the outer window assembly 310 to be easily and quickly secured in place. Finally, the continuous composite ring 370 provides a continuous seal for the window reveal and the outer window assembly.

Abutting edges of adjacent sidewall panels 140 may lack stiffening strips or trim strips, so that each sidewall panel 140 may be independently removed without affecting an adjacent sidewall panel 140. However, outboard trim strips (not shown) may be provided for aesthetic purposes and removably held into place by a hook and loop mechanism, such as Velcro™ that is well known in the art. Such a trim strip may also be conformingly attached to a frame of the airframe and attached to the outboard side of a vertical sidewall panel edge 153, 157 by means of a hook and loop mechanism. Other arrangements may be used without departing from the scope of the invention.

Figure 3:
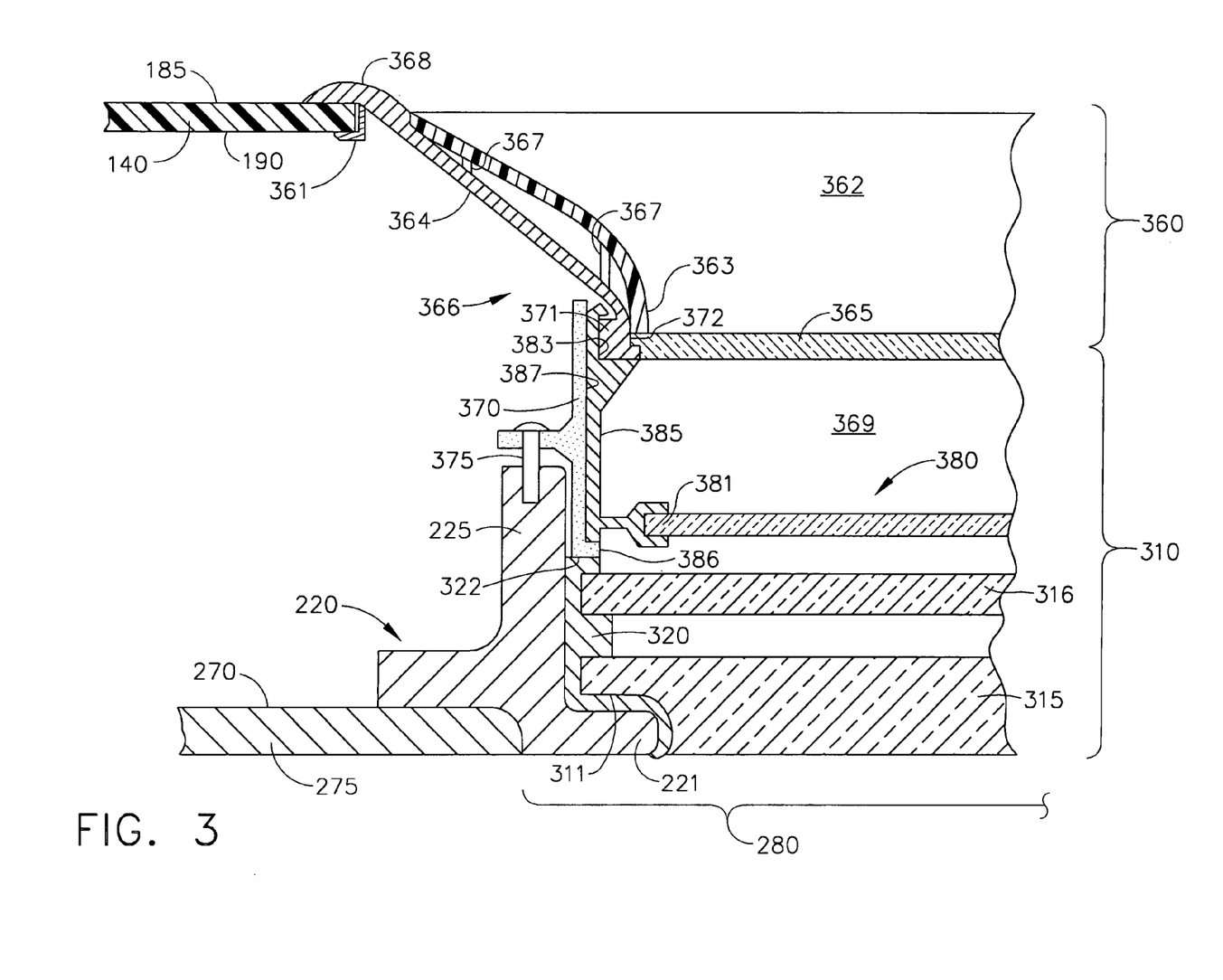
FIG. 3 is a cross sectional view of a window assembly illustrating the manner in which the window assembly may be inserted through the sidewall panel and guided into a window forging in the exterior wall of an aircraft fuselage, according to an embodiment of the present invention.

A cross sectional view of the window reveal 360 may be seen in FIG. 3, as it relates to the sidewall panel 140 and the inboard surface 270 of the outboard wall 275 of the aircraft frame. According to FIG. 3, the inwardly extending flange 221 of window forging 220 may be shaped to accept an outer window assembly 310 that is comprised of an outer pane 315 and an inner pane 316, where the panes are held in spaced relationship by an outer window gasket 320. The outer window assembly 310 may be placed into the window forging 220 from the inboard side, where it may be prevented from outward excursion by an outwardly-facing rabbet 311 around the circumference of the outer pane 315 that mates with opposing and inwardly extending flange 221 on the window forging 220, with a portion of the outer window gasket 320 sandwiched therebetween to form a tight seal. The higher air pressure inside the aircraft cabin may act outwardly to force the outer window assembly 310 against flange 221 that, in combination with the gasket 320, holds the window assembly 310 in place.

On the inboard side of the outer window assembly 310 may be additionally placed a composite ring 370 for insertion into the forging and pressing against an inboard rim 322 of the outer window gasket 320. The composite ring 370 may form a continuous mounting structure securing the assembly formed by the outer pane 315, inner pane 316, and outer window gasket 320 to the window forging 220. It may also be fabricated to support a dimmable pane 380 a spaced distance inboard of the inner pane 316. The dimmable pane 380, or "smart window", may be constructed of materials that allow the opacity of the dimmable pane 380 to be controlled by varying an electrical voltage (not shown) that is applied across the expanse of the dimmable pane 380. The dimmable pane 380 may be cushioned by an inner gasket 385 that is supported in turn by a lip 386 around an outboard edge of the composite ring 370 and covering the inner surface 387 of the composite ring 370. The composite ring 370 may be closely fitted within the window forging 220 and secured thereto by a plurality of removable fasteners 375.

The inner gasket 385 that supports the dimmable pane 380 may also provide vibration isolation between the airframe and the dimmable pane 380, and thus reduce noise. The assembly formed by the inner gasket 385, the composite ring 370, and the dimmable pane 380 may also seal the outer 315 and inner 316 panes from cabin air and thereby prevent fogging. Because the dimmable pane 380 may be attached with the flexible inner gasket 385, then as the aircraft pressurizes and the outer pane 315 deforms outwardly, the dimmable pane 380 may also flex outwardly to equalize the pressure. This may prevent the pressure differential from acting on the fail safe inner pane 316.

Power for the dimmable pane 380 may be provided by a standard flat wire connection that may be spliced with a standard automotive tool that eliminates the need for discrete electrical connectors, thereby eliminating parts and weight. The flat wire may be attached to the outboard surface 190 of the sidewall panel 140 so that additional support hardware is not required; however, other forms of wiring may be used without departing from the scope of the invention.

A window reveal 360 may be inserted each window panel opening 180 in sidewall panel 140 from the inboard side.

The window reveal 360 is further composed of a chassis 364 into which a bezel 362 may be snapped into place. The window reveal 360 may have an inwardly tapering perimeter 366 along its outboard edge, so that it may guide the sidewall panel 140 into proper alignment with the corresponding window forging 220. The outboard edge of chassis 364 may be formed to snugly conform to the inboard portion of the inner gasket 385, so that a seal is formed thereby to prevent the intrusion of dust, moisture, and other foreign matter. The tapered profile formed by the draft angle of the window reveal 360 may result in a tapered profile which facilitates alignment of the sidewall panel 140 to the window forgings 220 in the outboard wall 275 in a manner similar to that of a ramped guide or a tapered pin. When the sidewall panel 140 is in the installed configuration, the larger circumference of the tapered window reveal 360 may form a snug seal between the sidewall panel 140 and the outer window structure 310 in the window forging 220. This may prevent translation along an X axis or the Z axis, as well as rotation about the Y axis (FIG. 1).

The window reveal 360 may be provided as a component of the modular sidewall system. Window reveal 360 may be inserted into the opening of the sidewall panel 140 until its rim 368 makes abutting contact with the inboard surface 185 of the sidewall panel 140, so that it is held in place by its snap-fit fastener 361 in a similar fashion to the way that the sidewall panel 140 is connected to the frames 210, 211. A tooling hole (not shown) in the window reveal 360 may be provided to allow the snap-fit fastener 361 to be disengaged in a manner similar to that of prior art window reveals. Such an arrangement may be advantageous, since it may facilitate maintenance of the outer window assembly 310 without removing the sidewall panel 140 or other interior components for the modular sidewall system.

The window reveal 360 may be comprised of a chassis 364 and a bezel 362. A protruding ridge 371 may encircle the outboard edge of the chassis 364 and may be releasably captured and held by groove 383 along the inner surface of the inner gasket 385. The outboard edge of chassis 364 may also have a frame groove 372 along its inner surface, into which the edge of the dust cover 365 may be inserted. The outer end 363 may be configured so that it mates and overlaps with the frame groove 372 so that it holds a transparent dust cover 365 against the frame groove 372, so that the space between the dust cover 365 and the dimmable pane 380 is sealed from outside contaminants. Removal of bezel 362 may permit the dust cover 365 to be removed without further disassembly of the window reveal 360. The bezel 362 may be held in place by a plurality of snap-fit fasteners 367 spaced along the circumference of the bezel 362. These snap-fit fasteners 367 firmly hold the bezel 362 against both the chassis 364 and the dust cover 365. This construction may allow the dust cover 365 to be removed without removing the window reveal 360 from the sidewall panel 140.

One advantage of this arrangement may be found in the fact that all surfaces outboard of the dimmable window 380 may be sealed from contamination by dust. Such dust, which is found behind the sidewall panel and inside the sidewall core, may be left over from routing and installation of the various portions of the sidewall system. Each time the window reveal 360 is removed or re-installed, such dust is agitated. The dust cover 365 has been observed in practice to be prone to static build-up, and therefore, contaminants may be drawn to the cavity 369 between the dust cover 365 and the outer window assembly 310. By configuring the dust cover 365 so that it can be removed by removing only the bezel 362, and not by removing the entire window reveal 360, no dust may be stirred-up when cleaning the dust cover 365. This feature may also isolate the dust cover 365 from contamination sources better than existing configurations because, when cleaning the visible surfaces with the sidewall panel 140 installed, the seals to the outer window assembly 310 prevent dust intrusion from the outboard side of the cavity 369 within the window forging 220. Once installed, the dust cover 365 may seal this cavity 369 from the inboard side, thus preventing such contamination.

The interface between the window reveal 360 and the composite ring 370 may allow some inboard/outboard motion of the window reveal 360 relative to the airframe, i.e. the outer window assembly 310 and the outboard wall 275, to prevent a structural path for vibration borne noise to follow. This configuration may also eliminate light leak paths, which are a major concern and area of rework in existing sidewall panels.

Figure 4:
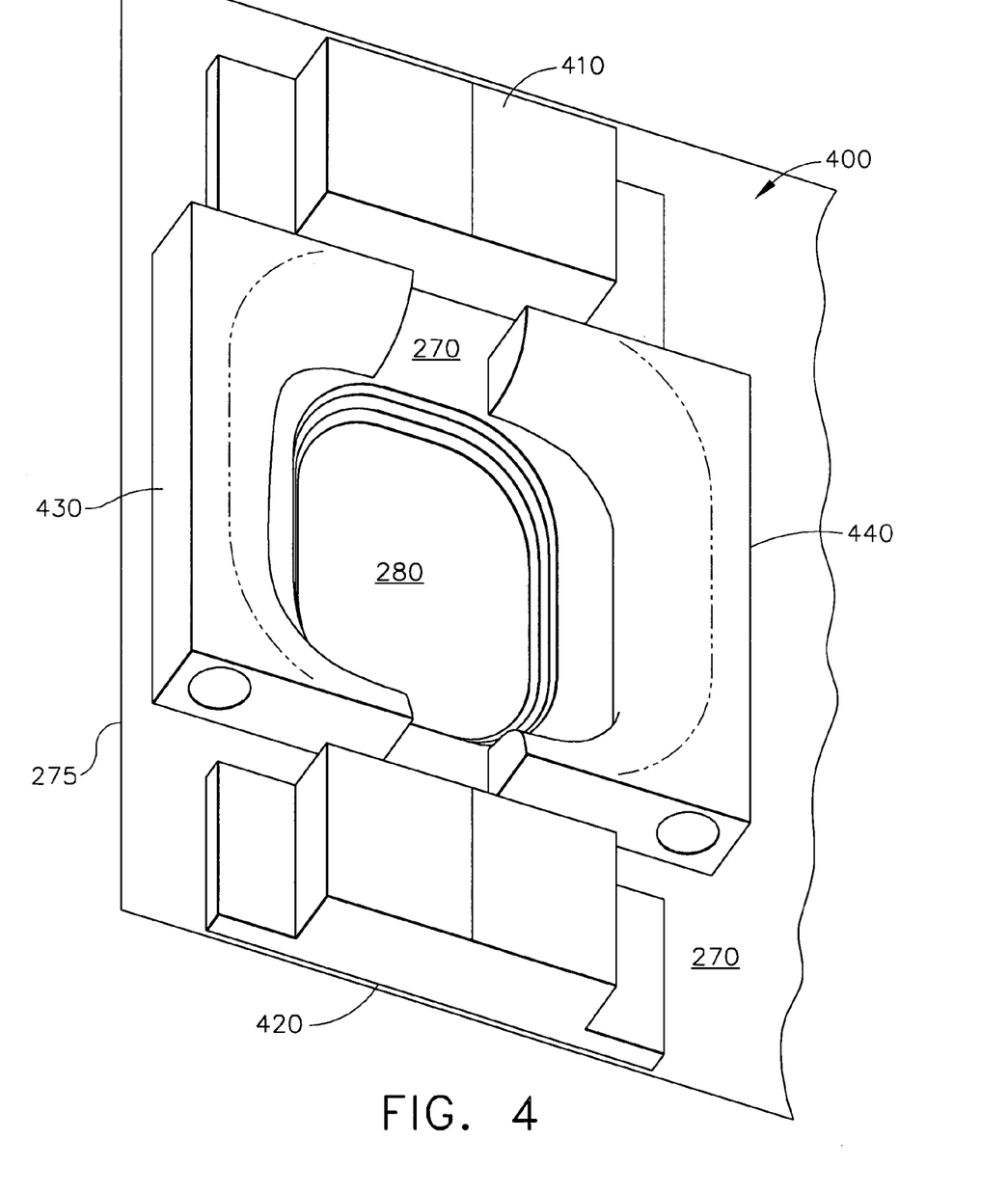
FIG. 4 is an exploded perspective view of the outboard side of a sidewall panel showing a portion of a thermo-acoustic insulation subsystem, according to an embodiment of the present invention.

Referring now to FIG. 4, a thermo-acoustic insulation subsystem 400 may be provided between the sidewall panel 140 and the inboard surface 270 of the outboard wall 275, as an additional component of the invention. The thermo-acoustic insulation subsystem includes self supporting blocks of insulating foam surrounding the structural openings 280 and sandwiched between the outboard surface 190 of the sidewall panel 140 and the inboard surface 270 of the outboard wall 275, and also held between frames 210, 211 of the airframe. The self supporting blocks may be held in place primarily by compression between frames 210, 211, with assistance of a minimal number of strategically-placed brackets. The blocks may be comprised of foam materials that hold their shape and conform to aviation requirements relating to resistance to fire and weight. Such materials that may be used for this purpose may be, for example, melamine or polyurethane. Polyurethane may be formed by a reaction injection molded (RIM) process, in which two chemicals are mixed upon injection into a mold, whereupon they react chemically and expand to fit the mold. Melamine may be formed to shape by machining foam blocks. As seen in FIG. 4 looking at the inboard side of an outer sidewall 270, an upper foam block 410 and a lower foam block 420 may be formed for installation above and below the outer window assembly 310, and left foam block 430 and right foam block 440 may be formed to surround the outer window assembly 310. The inner sides of foam blocks 430, 440 may be fabricated to conform to the outboard side of the window reveal 360 when it is mated with the outer window assembly 310. Tests show that 1–2% longitudinal compression in the foam blocks between the frames 210,211 is sufficient to keep them in place behind the sidewall panel 140. Since such semi-rigid foam blocks may be held in place primarily by slight longitudinal compression, the need for numerous clips, brackets, and other auxiliary fasteners, used heretofore to hold insulation in place by piercing the previously-used insulation blankets, may be greatly diminished. This may reduce weight, total part count, noise passage through holes where brackets pierce the insulation, noise passage through gaps between the insulation and adjacent aircraft systems, and installation time.

The foam blocks 410, 420, 430, 440 may be machined or molded to accommodate standard architecture that is present in the airframe of every aircraft, such as shear ties, conduits for electrical cables, and environmental control system (ECS) ducts. It may be seen that, in machining or molding thin sections into the foam blocks to provide sufficient clearance for the ECS ducts, the foam blocks may lose the rigidity required to maintain a good compression fit between the frames 210, 211. There may be insufficient volume between the fuselage structure and the sidewall panel 140 to accommodate system runs and insulation. If a wide ECS riser duct with a tubular diameter of 3 inches is present for carrying ventilation air from the floor to the overhead structures with low air speed in order to generate a minimal amount of noise, the riser duct tube may occupy a significant amount of usable volume along its length, leaving little room for thermo-acoustic insulation. ECS riser ducts are constructed of light weight materials, and since they displace volume that would otherwise be filled with insulation, they may create a path for noise and vibration on either side of the window assemblies. Therefore, the foam blocks 430, 440 surrounding the window reveal may be fabricated of a foam material having a higher density than that of foam blocks 410, 420, so that greater noise and vibration damping may be provided along the row of window assemblies. This may localize the insulation mass along the window belt as opposed to spreading the insulation mass throughout the panel.

Figure 5:
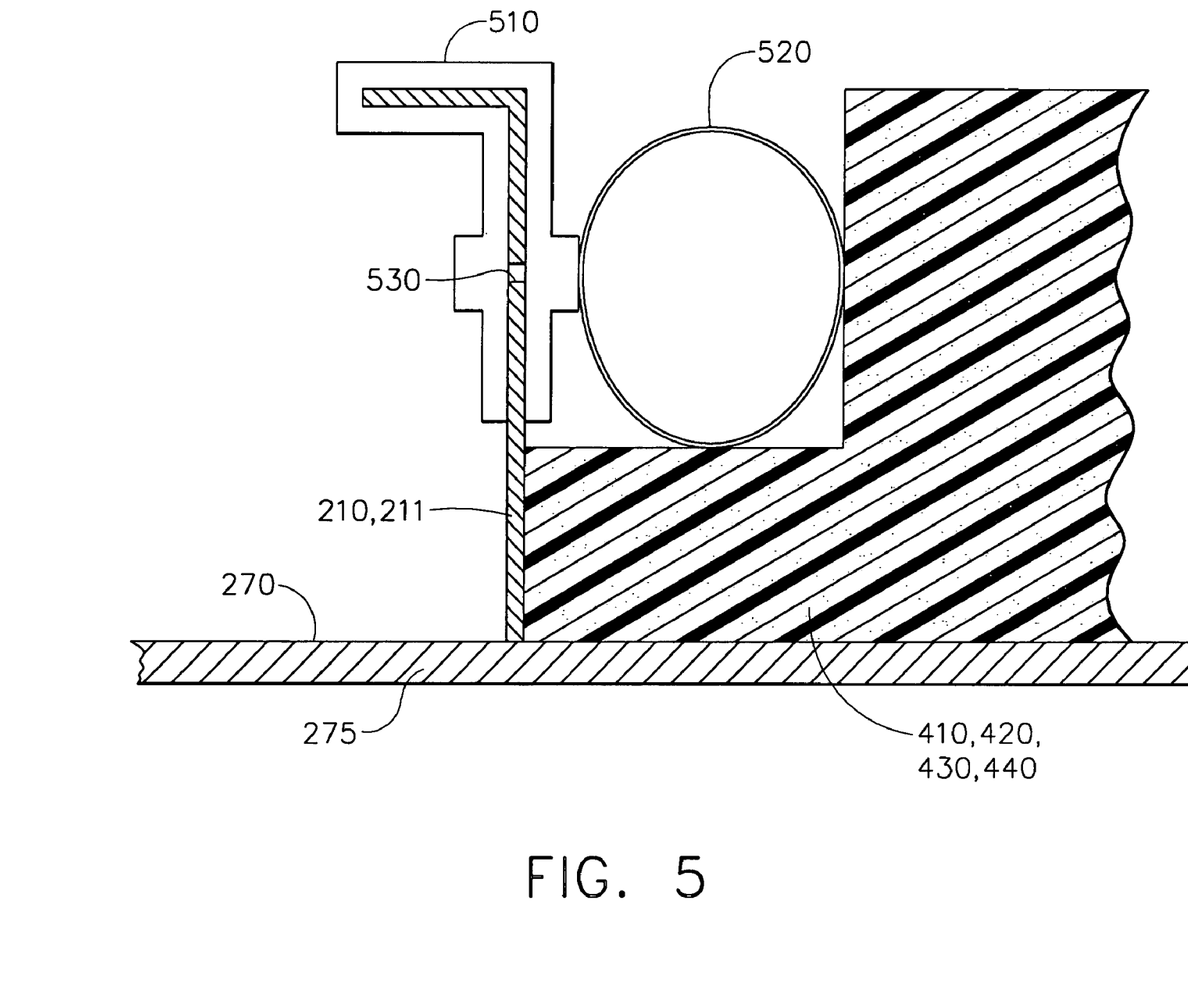
FIG. 5 is a cross sectional view of a support bracket for supporting airframe architecture for installation between a fuselage wall and a sidewall panel, according to an embodiment of the present invention.

In order for the components of the invention to accommodate ECS riser ducts, wire bundles, and insulation between the sidewall panel 140 and the outboard wall 275, a standard bracket 510 may be provided, as shown by FIG. 5. This bracket 510 may be used to support the riser ducts, wire bundles, and insulation, the sidewall panels 140, or both, as the particular situation warrants. The bracket 510 may clip onto a frame 210, 211 by use of a snap-fit feature that interfaces with a stable hole 530 in the frame 210, 211. The bracket 510 may have a stable fitting portion that saddle brackets 520 of varying sizes may be clipped to support system runs of different sizes. In this way, common interfaces to airframe may be used to accommodate various sizes of systems runs.

Figure 6:
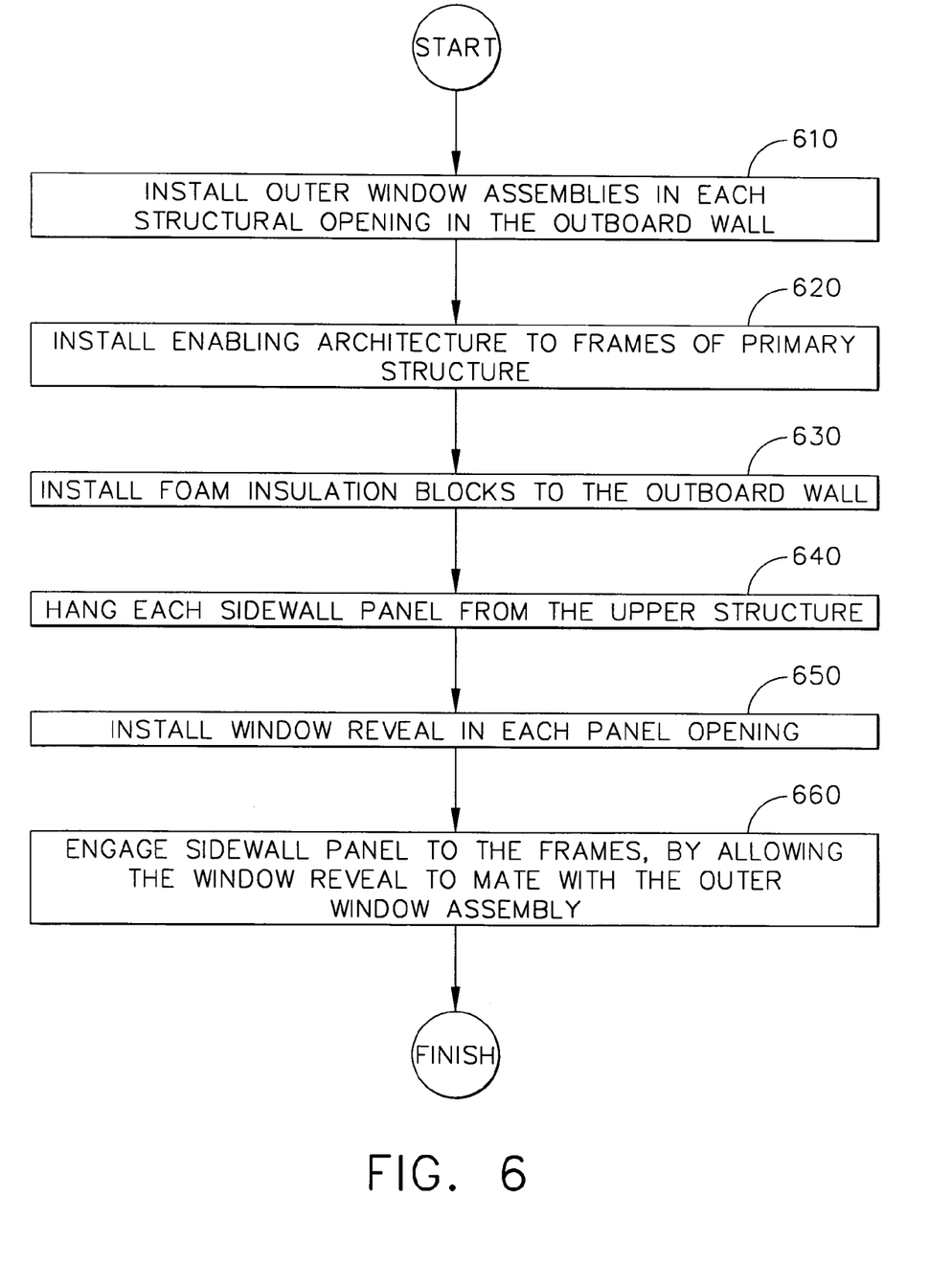
FIG. 6 is a flow diagram of a method of assembling and installing an integrated window belt system to a cabin wall, according to an embodiment of the present invention.

Referring now to FIG. 6, a flowchart is given that shows the method of fabricating and installing the integrated window belt system. It should be noted that the steps of the method may be performed in other sequences than the particular sequence shown, and that the particular sequence embodied by the flowchart is representative. In order to configure the system, the interior cabin wall of an airframe should be prepared with all or substantially all auxiliary aircraft systems in place. Wiring bundles and ECS ductwork should be generally positioned in their proper locations against the outboard wall 275 and between the frames 210, 211 of the airframe. The outer window assemblies 310 may be installed within each structural opening 280 in the outboard wall 275, according to the block labeled as 610, and secured thereto. The brackets and fasteners comprising the enabling architecture may then be installed along the frames 210, 211 of the airframe, according to the block labeled as 610. Blocks 410–440 of foam insulation may be installed in their proper places along the outboard wall 275, according to the block labeled as 630. Note that these steps 610, 620, and 630 may be performed in any order, although if the blocks 410–440 of foam insulation require support from the enabling architecture, then the step indicated by block 620 may be performed before the step indicated by block 630. When the enabling architecture, the outer window assemblies 310, and the blocks 410–440 of foam insulation have been installed in their required positions, the sidewall panels 140 may be hung from the upper structure 170 within the aircraft cabin, according to the block indicated by 640. The window reveals 360 may be installed into each panel opening 180 and secured therein by snap-fit fasteners, according to the block indicated by 650. Finally, each sidewall panel 140 may be seated against the inboard side of the frames 210, 211 and secured along the lower edge 150 of the sidewall panel 140, according to the block indicated by 660. Engagement of the sidewall panels 140 against the frames 210, 211 may be made by the snap-fit fasteners associated with each sidewall panel 140. When the sidewall panels 140 are engaged, they may slightly compress the foam insulation blocks 410–440 so that they may be held in place by the compression, the enabling architecture, or both.

Note that some of these operations must be performed in a specified order, while the order of other operations is independent. For example, the window forging 220 must be installed first as it forms an integral part of the airframe. The enabling architecture brackets 510 may be installed prior to the installation of the ECS ducts, wiring runs, and insulation, in order to secure these aircraft components into the fuselage. The details of how the insulation is sculpted to fit around these aircraft systems may dictate whether the wiring runs or insulation is installed first. Installing the outer window assembly to the window forging and securing it with the composite ring may be done before or after installing the insulation, enabling architecture brackets, and ECS ducts or wiring runs. The window reveal 360 may be installed to the sidewall panel 140 as a unit, so that fewer parts must be secured to the aircraft late in the installation process for minimal installation cost. The oblong shapes of the window reveal and window opening align the window reveal to the sidewall panel in the correct clocking orientation. By installing the sidewall panel 140 with the window reveal already installed, the locating guide function of the window reveal may align the window reveal to the window forging and the male and female parts of the snap fit features simultaneously Thus, an integrated window belt system has been described, which may be easily installed in less time than heretofore because of its use of snap-fit fastenings, foam block insulation, and separately removable window reveals. These components of the innovative modular sidewall panel synergistically provide a maintainable system that is easily assembled, installed, and disassembled for routine maintenance. It should be understood, of course, that the foregoing relates to exemplary embodiments of the invention and that modifications may be made without departing from the spirit and scope of the invention as set forth in the following claims.

We claim:

1. A sidewall panel for use within a cabin of an airframe formed by plurality of frames and an outboard wall, the cabin having dado panel along a floor of the cabin and longitudinally extending the length of the cabin, the cabin further having an upper structure longitudinally extending along an upper portion of the cabin, the sidewall panel comprising a curved structure conforming in an operationally installed position to an inboard side of the frames, the curved structure having a panel opening, an inboard surface, an outboard surface, a lower edge, and a top edge, the lower edge aligned with the dado panel and the top edge aligned with the upper structure;

a first snap-fit fastener aligned along the lower edge for removable attachment of the lower edge to a selected frame;

an attachment mechanism along the top edge for pivotal attachment with the upper structure, wherein the attachment mechanism supports the curved surface for swinging inboard and outboard movement about an longitudinally oriented axis formed by the attachment mechanism;

a window reveal sized for snug insertion through the panel opening and held within the panel opening by a second snap-fit fastener; and a single part continuous annular composite ring that receives, aligns, and seals the window reveal and that connects the window reveal with an outer window assembly.

2. The sidewall panel described in claim 1, wherein the first snap-fit fastener is removably attached to a bracket on the selected frame.

3. The sidewall panel described in claim 2, wherein the dado panel is removably attached to the bracket.

4. The sidewall panel described in claim 1, wherein the window reveal further comprises an inwardly tapering perimeter disposed to guide the sidewall panel and window reveal into their operationally installed positions, the inwardly tapering perimeter engaging in a mating relationship the outer window assembly installed in the outboard wall as the sidewall panel swings about the attachment mechanism.

5. A sidewall panel assembly comprising a sidewall panel having a panel opening, an inboard surface, and an outboard surface, the sidewall panel spanning a plurality of frames, the sidewall panel having a first snap-fit fastener integral with the sidewall panel and disposed to allow removable attachment of the sidewall panel to a first selected frame; and a window reveal with a rim and an inwardly tapering perimeter, the window reveal sized for snug insertion through the panel opening, the window reveal being removably attached within the panel opening and against the inboard surface of the sidewall panel by a second snap-fit fastener that is integral to the window reveal, wherein the rim of the window reveal makes abutting contact with the inboard surface of the sidewall panel;

a single part continuous annular composite ring that receives, aligns, and seals the window reveal and that connects the window reveal with an outer window assembly; and a dimmable pane supported by the composite ring, wherein the opacity of the dimmable pane is controlled by varying an electrical voltage applied across the expanse of the dimmable pane;

wherein the inwardly tapering perimeter positions the window reveal and sidewall panel into their operationally installed positions as the inwardly tapering perimeter guides the window reveal into a mating relationship with the outer window assembly when the sidewall panel is positioned for operational attachment on the plurality of frames with the panel opening generally opposing an outer window assembly in an outboard wall; and wherein the outer window assembly is accessible with the sidewall panel installed.

6. The sidewall panel assembly of claim 5, wherein the window reveal comprises a chassis providing support for the second snap-fit fastener; the rim of the window reveal and the inwardly tapering perimeter of the window reveal both defined by the chassis, a dust cover removably inserted into and supported by the chassis, and a bezel with a third snap-fit fastener integral to the bezel, the bezel disposed for insertion into the chassis against the dust cover, the bezel held firmly against the dust cover by the third snap-fit fastener, wherein the bezel is removable from the installed window reveal providing access to the dust cover.

7. The sidewall panel assembly of claim 6, wherein the rim of the chassis is held against the outboard surface by engagement of the second fastener with the inboard surface.

8. The sidewall panel assembly of claim 6, wherein the outboard edge of the chassis has an inwardly oriented lip supporting the dust cover with the lip preventing outboard excursion of the dust cover.

9. The sidewall panel assembly of claim 8, wherein the bezel holds the dust cover firmly against the inwardly oriented lip.

10. The sidewall panel assembly of claim 6, wherein said dimmable pane is held in place along a dimmable pane edge by an inner gasket.

11. The sidewall panel assembly of claim 10, wherein the inner gasket has a groove inboard of the dimmable pane, the groove receiving the inwardly tapering perimeter for mating engagement with the inner gasket.

12. The sidewall panel assembly of claim 5, further comprising a first foam block positioned between the outboard surface of the sidewall panel and the outboard wall, the first foam block compressed between the first selected frame and a second selected frame, wherein said foam block is held in place by longitudinal compression.

13. The sidewall panel assembly of claim 12, wherein the first foam block is longitudinally compressed between the first selected frame and the second selected frame by an amount in the range of about 1% to about 2%.

14. The sidewall panel assembly of claim 12, wherein a plurality of second foam blocks surrounds the window reveal.

15. The sidewall panel assembly of claim 12, wherein the first foam block has a vertical passage therethrough to allow air ducts to pass.

16. The sidewall panel assembly of claim 12, wherein the first foam block is fabricated from a material chosen from group composed of melamine and polyurethane.

17. The sidewall panel assembly of claim 14, wherein the first foam block is fabricated from a first insulation material and the plurality of second foam blocks is fabricated from a second insulation material that is denser than the first insulation material.

18. The sidewall panel assembly of claim 17, wherein the first foam block is fabricated from melamine and the plurality of second foam blocks is fabricated from polyurethane.

19. A sidewall panel assembly for an airframe being comprised of a plurality of frames covered by an outboard wall having a structural opening, the sidewall panel assembly comprising an outer window assembly comprising an outer pane surrounded by an outer window gasket, the outer window assembly supported within the structural opening by a window forging and held against the window forging by a single part continuous composite ring, the composite ring with a gasket having an inwardly-opening annular groove;

a sidewall panel having a panel opening, an inboard surface, and an outboard surface, the sidewall panel operationally positioned with the outboard surface aligned along an inboard side of a first selected frame;

a window reveal with a rim and an inwardly tapering perimeter, the window reveal sized for snug insertion through the panel opening with the inwardly tapering perimeter received by the annular groove of the composite ring, wherein the window reveal is removably held in place by a snap-fit fastener, and wherein the outer window assembly is accessible with the sidewall panel installed; and a plurality of self supporting foam insulation blocks positioned between the sidewall panel and the outboard wall, wherein the blocks a held in place by longitudinal compression, and wherein the blocks are formed.

20. The sidewall panel assembly described in claim 19, wherein the composite ring further supports a dimmable pane held within the inner window gasket and outboard of the annular groove by a dimmable pane edge, wherein the opacity of the dimmable pane is controlled by varying an electrical voltage applied across the expanse of the dimmable pane.

21. The sidewall panel assembly described in claim 19, wherein the rim rests on the inboard surface of the sidewall panel, the window reveal further comprising a fastener integral with the window reveal for engagement with the outboard surface off the sidewall panel so that engagement of the fastener holds the rim firmly against the inboard surface, the fastener and window reveal disposed so that disengagement of the fastener from the outboard surface allows the window reveal to be removed from the panel opening for access to the outer window assembly without removal of the sidewall panel from its operational position.

22. The sidewall panel assembly described in claim 19, wherein the plurality of foam insulation blocks is comprised of a first group and a second group, the first group positioned above and below the panel opening and the second group positioned around the panel opening, the second group fabricated from a foam insulating material that is denser than the foam insulating material from which the first group is fabricated.

23. The sidewall panel assembly described in claim 22, wherein each foam block in the first group is longitudinally compressed between the first selected frame and a second selected frame.

24. A modular sidewall panel system for an aircraft having a cabin inboard of an airframe, the airframe comprised of vertically oriented frames, each of which having an inboard side and an outboard side, and an outboard wall permanently attached to an outboard side of the frames, the outboard wall with a plurality of regularly spaced structural openings extending longitudinally along and through the outboard wall and between the frames, the cabin having a floor, a dado panel extending longitudinally the length of the cabin adjacent to the floor and below the structural openings, and an upper structure extending longitudinally the length of the cabin over the structural openings, each structural opening with an outer window assembly, the system comprising:

a sidewall panel with an upper edge and a lower edge, the sidewall panel attached along its upper edge to upper structure and attached along its lower edge to the dado panel by snap-fit fastening, the sidewall panel further conforming to the inboard side of the frames, the sidewall panel with an panel opening generally opposing one of the structural openings when the sidewall panel is supported and attached;

a window reveal with a rim and a inwardly tapering outboard perimeter, the window reveal adapted for insertion through the panel opening from the inboard side of the sidewall panel, the rim resting on the inboard side of the sidewall panel to constrain further insertion therethrough, the tapering outboard perimeter aligning with and opposing the outer window assembly;

a single part continuous annular composite ring that receives, aligns, and seals the window reveal and that connects the window reveal with the outer window assembly, wherein the alignment of the window reveal to the outer window assembly assists the alignment of the sidewall panel with the frames; and one or more foam insulation blocks formed and adapted for positioning between the sidewall panel and the outboard wall, wherein the foam blocks are held in place by longitudinal compression and brackets.

25. The sidewall system of claim 24, wherein the window reveal comprises a dust cover and a bezel, the rim formed along an inboard side of the reveal and the tapering outboard perimeter formed along an outboard side of the reveal.

26. The sidewall system of claim 25, wherein the reveal comprises a chassis and a bezel, the bezel holding the dust cover within the chassis.

27. The sidewall system of claim 26, wherein the bezel may be removed from the chassis without removing the chassis from the panel opening, so that the dust cover may be removed.

28. The sidewall system of claim 26, wherein the bezel is attached to the chassis by a snap-fit fastener.

29. The sidewall system of claim 28, wherein the snap-fit fastener is integral with the bezel.

30. The sidewall system of claim 25, wherein the foam insulation blocks are fabricated from a material selected from the group composed of melamine and polyurethane.

31. An integrated window belt system for an aircraft having a cabin inboard of an airframe, the airframe comprised of a plurality of frames, each frame having an inboard side and an outboard side, and an outboard wall permanently attached to an outboard side of the plurality of frames, the outboard wall with a plurality of structural openings extending longitudinally along and through the outboard wall and between the frames, the cabin having a floor, a dado panel extending longitudinally the length of the cabin adjacent to the floor and below the plurality of structural openings, and an upper structure extending longitudinally the length of the cabin over the plurality of structural openings, the system comprising:

a plurality of sidewall panels, each sidewall panel with an upper edge and a lower edge, each sidewall panel attached by an attachment mechanism situated along its upper edge to the upper structure for pivotal movement along a longitudinal axis, each sidewall panel aligned along its lower edge to the dado panel, each sidewall panel removably attached to the dado panel with one or more first snap-fit fasteners, each sidewall panel conforming to the inboard side of the plurality of frames, each sidewall panel having a panel opening opposing one of the structural openings when the sidewall panel is supported and attached;

a plurality of outer window assemblies, each outer window assembly affixed within a selected structural opening;

a plurality of window reveals, each window reveal with a rim and a inwardly tapering outboard perimeter, each window reveal adapted for insertion through a selected panel opening from the inboard side of a selected sidewall panel and attached to the selected sidewall panel by one or more second snap-fit fasteners, the rim resting on the inboard side of the selected sidewall panel to constrain further insertion therethrough, the tapering outboard perimeter mating with and attached to a selected outer window assembly the window reveal removably attached to the sidewall panel by snap-fit fastening;

a single part continuous annular composite ring that receives, and seals the window reveal and that aligns and connects the window reveal with the outer window assembly, wherein the alignment of the window reveal to the outer window assembly assists the alignment of the sidewall panel with relationship to the frames;

a dimmable pane supported by the composite ring, wherein the opacity of the dimmable pane is controlled by varying an electrical voltage applied across the expanse of the dimmable pane; and a plurality of foam insulation blocks formed and positioned between the plurality of sidewall panels and the outboard wall.

32. A method of assembling a maintainable modular sidewall panel system within an aircraft cabin, the cabin with a floor and a plurality of frames extending upwardly from the floor, each frame with an inboard side and an outboard side, an outboard wall attached to an outboard side of the plurality of frames, the outboard wall with a plurality of structural openings extending longitudinally along and through the outboard wall and between the plurality of frames, the cabin having a dado panel extending longitudinally the length of the cabin adjacent to the floor and below the plurality of structural openings, the cabin further having an upper structure extending longitudinally the length of the cabin above the plurality of structural openings, each structural opening with an outer window assembly, the method comprising the steps of:

installing brackets along the plurality of frames;

inserting an outer window assembly within each structural opening, each outer window assembly having a inwardly protruding window forging;

attaching a plurality of insulation foam blocks along the outboard wall;

suspending the plurality of sidewall panels from the upper structure so that each sidewall panel conforms to the inboard side of the plurality of frames each sidewall panel having an upper edge and lower edge, each sidewall panel suspended along its upper edge for pivotal motion inwardly and outwardly about a horizontal axis along its upper edge, a selected number of the plurality of sidewall panels having at least one panel opening, each of the selected number longitudinally positioned so that each panel opening generally opposes one of the structural openings when the sidewall panel is aligned with the inboard side of the plurality of frames;

inserting through each panel opening from the inboard side of the sidewall panel a window reveal with a rim and an inwardly tapering outboard perimeter, the rim held against the inboard side of the sidewall panel by snap-fit fasteners and constrained from further insertion by the rim;

bringing the lower edge of the sidewall panel into attachment with snap-fit fasteners attached to a selected frame, thereby capturing the foam insulation blocks between the sidewall panel and the outboard wall;

quiding the inwardly tapering outboard perimeter of the window reveal into the window forging;

inserting the window reveal into a single part continuous annular composite ring that is affixed to a flange of the forging thereby aligning the sidewall panel with relationship to the frames, wherein a tapering fit between the window forging and the inwardly tapering outboard perimeter assists the alignment of the sidewall panel with the plurality of frames.

33. The method described in claim 32, wherein the step of attaching a plurality of insulation foam blocks along the outboard wall comprises the steps of installing a first group of insulation foam blocks above and below the plurality of structural openings, each insulation foam block in the first group having a first density; and attaching a second group of foam blocks between the plurality of frames and the window forgings around the structural openings, each insulation foam block in the second group having a second density that is higher in magnitude than that of the first group, the second group being contoured to allow the window reveal to be in contact with the second group when the window reveal is inserted therethrough.

34. The method described in claim 32, further comprising the step of engaging a snap-fit fastener integral to the window reveal with the outboard surface of the sidewall panel as the window reveal is inserted through the panel opening.

* * * * *